(12) United States Patent
Sakthikumar et al.

(10) Patent No.: US 9,047,468 B2
(45) Date of Patent: Jun. 2, 2015

(54) MIGRATION OF FULL-DISK ENCRYPTED VIRTUALIZED STORAGE BETWEEN BLADE SERVERS

(75) Inventors: Palsamy Sakthikumar, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 1216 days.

(21) Appl. No.: 12/317,945

(22) Filed: Dec. 30, 2008

(65) Prior Publication Data

US 2009/0169020 A1  Jul. 2, 2009

Related U.S. Application Data

(63) Continuation-in-part of application No. 11/966,136, filed on Dec. 28, 2007, now abandoned.

(51) Int. Cl.
*H04L 29/06* (2006.01)
*G06F 21/57* (2013.01)
*G06F 21/80* (2013.01)
*H04L 9/08* (2006.01)
*G06F 11/20* (2006.01)

(52) U.S. Cl.
CPC .............. *G06F 21/57* (2013.01); *G06F 11/203* (2013.01); *G06F 21/80* (2013.01); *G06F 2221/2107* (2013.01); *H04L 63/061* (2013.01); *H04L 9/0827* (2013.01); *H04L 9/0877* (2013.01)

(58) Field of Classification Search
USPC ....................................................... 380/278
See application file for complete search history.

(56) References Cited

U.S. PATENT DOCUMENTS

| | | | |
|---|---|---|---|
| 6,684,331 B1 * | 1/2004 | Srivastava ...................... | 713/163 |
| 7,062,570 B2 * | 6/2006 | Hong et al. ................... | 709/238 |
| 7,260,716 B1 * | 8/2007 | Srivastava ...................... | 713/163 |
| 7,272,664 B2 | 9/2007 | Arimilli et al. | |
| 7,334,124 B2 * | 2/2008 | Pham et al. ................... | 713/162 |
| 7,415,506 B2 | 8/2008 | Gajjar et al. | |
| 7,502,884 B1 * | 3/2009 | Shah et al. ..................... | 710/316 |
| 7,657,663 B2 * | 2/2010 | Freimuth et al. .................. | 710/5 |

(Continued)

OTHER PUBLICATIONS

Atsec information security corp., 'HP BladeSystem and Virtual Connect Suitability in PCI DSS Compliant Deployments', Feb. 29, 2012 Version 1.0, HP and atsec information security corporation, entire document, http://h20195.www2.hp.com/v2/GetPDF.aspx%2F4AA4-6580ENW.pdf.*

(Continued)

*Primary Examiner* — Luu Pham
*Assistant Examiner* — Ronald Baum
(74) *Attorney, Agent, or Firm* — Grossman, Tucker, Perreault & Pfleger, PLLC (57) ABSTRACT

A method, system and computer-readable storage medium with instructions to migrate full-disk encrypted virtual storage between blade servers. A key is obtained to perform an operation on a first blade server. The key is obtained from a virtual security hardware instance and provided to the first blade server via a secure out-of-band communication channel. The key is migrated from the first blade server to a second blade server. The key is used to perform hardware encryption of data stored on the first blade server. The data are migrated to the second blade server without decrypting the data at the first blade server, and the second blade server uses the key to access the data. Other embodiments are described and claimed.

15 Claims, 5 Drawing Sheets

(56) References Cited

U.S. PATENT DOCUMENTS

| | | | |
|---|---|---|---|
| 7,743,197 B2* | 6/2010 | Chavan et al. | 710/314 |
| 8,019,996 B2* | 9/2011 | Hashimoto et al. | 713/169 |
| 8,234,518 B2* | 7/2012 | Hansen | 714/4.11 |
| 8,447,833 B2* | 5/2013 | Nightingale et al. | 709/217 |
| 2002/0062372 A1* | 5/2002 | Hong et al. | 709/225 |
| 2002/0161848 A1* | 10/2002 | Willman et al. | 709/213 |
| 2004/0010612 A1* | 1/2004 | Pandya | 709/230 |
| 2005/0060590 A1 | 3/2005 | Bradley et al. | |
| 2005/0177749 A1* | 8/2005 | Ovadia | 713/201 |
| 2005/0251567 A1* | 11/2005 | Ballew et al. | 709/223 |
| 2005/0251802 A1 | 11/2005 | Bozek et al. | |
| 2006/0074949 A1* | 4/2006 | Haruna et al. | 707/100 |
| 2006/0224843 A1* | 10/2006 | Rao et al. | 711/161 |
| 2006/0285693 A1* | 12/2006 | Raikar | 380/278 |
| 2006/0294351 A1 | 12/2006 | Rostampour | |
| 2007/0174850 A1 | 7/2007 | El Zur | |
| 2008/0126542 A1 | 5/2008 | Rhoades et al. | |
| 2008/0133709 A1 | 6/2008 | Aloni et al. | |
| 2008/0172554 A1 | 7/2008 | Armstrong et al. | |
| 2008/0270564 A1 | 10/2008 | Rangegowda et al. | |
| 2008/0271122 A1* | 10/2008 | Nolan et al. | 726/4 |
| 2009/0150547 A1 | 6/2009 | Tripathi | |
| 2009/0158081 A1 | 6/2009 | Dake et al. | |

OTHER PUBLICATIONS atsec information security corp., 'HP BladeSystem and Virtual Connect Suitability in PCI DSS Compliant Deployments', Feb. 29, 2012 Version 1.0, HP and atsec information security corporation, entire document, http://h20195.wwww2.hp.com/v2/GetPDF.aspx%2F4AA4-6580ENW.pdf.*

Hitachi Data systems, 'Hitachi Compute Blade 500', Hitachi Data systems, Nov. 2014, entire document, http://www.hds.com/assets/pdf/hitachi-compute-blade-500-whitepaper.pdf.*

Jacob, Joe, "MILSs: High-Assurance Security at Affordable Costs". Nov. 2005, 6 Pages. Retrieved from http://www.cotsjournalonline.com/home/article.php?id=100423.

"The Office Enablement Kit", 2 Pages. Retrieved from www.ibm.com/systems/bladecenter.

Trusted Computing Group (TCG) TPM Main Part 1 Design Principles Version 1.2, level 2 revision 103, dated Jul. 9, 2007.

Weiss, "TPM Enterprise Key Management requires centralized Hardware-based Security", Securing Electronic Business Processed, Vieweg (2006).

Jacob, Joe, "Mils: High-Assurance Security at Affordable Costs". Nov. 2005, 6 Pages. Retrieved from http://www.cotsjournalonline.com/home/article.php?id=100423.

"The Office Enablement Kit", 2 Pages. IBM Corp, 2007, Retrieved from www.ibm.com/systems/bladecenter.

* cited by examiner

FIG. 5

MIGRATION OF FULL-DISK ENCRYPTED VIRTUALIZED STORAGE BETWEEN BLADE SERVERS

RELATED APPLICATION

This application is a continuation-in-part of co-pending U.S. patent application Ser. No. 11/966,136, filed Dec. 28, 2007, and entitled "Method and System for Migrating a Computing Environment Across Blade Servers," which is assigned to the assignee of the present application and incorporated by reference herein in its entirety.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

TECHNICAL FIELD

The present disclosure relates generally to migration of data between computer systems.

BACKGROUND

Blade servers are self-contained computer servers configured for high-density computing environments. Blade servers are housed in blade enclosures, which may be configured to hold a plurality of blade servers. The plurality of blade servers and the blade enclosure form a blade server system. In a typical blade server system, each of the blade servers includes individual processors, memory, chipsets, and data storage. For example, each blade server may include one or more hard drives. During operation, each blade server stores data related to the operation of the particular blade server on its associated hard drive. As such, if a failure of one or more of the blade servers occurs, migration of the computer environment of the blade server experiencing the failure requires transfer of all the data stored on the associated hard drive to a hard drive of a replacement blade server. Such data transfer involves large amounts of data and bandwidth resulting in long data migration periods.

This migration process may be further affected when the blade server is used to store sensitive or confidential information. Sensitive or confidential information may be protected using security mechanisms such as encrypting the data and/or making use of security hardware to protect the data from unauthorized access. For example, full disk encryption (or whole disk encryption) is a kind of disk encryption (performed by either software or hardware) which encrypts every bit of data that is stored on a disk. Encryption and decryption keys are bound to the particular hardware device storing the data. Movement of data from one hardware device to another requires decryption of the data, movement of the decrypted data from one hardware device to the other, and then encryption of the data at the new hardware device. This decryption and re-encryption process further slows the migration process from one blade server to another.

A blade server may also include security hardware such as a trusted platform module (TPM). A TPM is a hardware component, typically a microcontroller, which resides within a processing system and provides various facilities and services for enhancing the security of the processing system. A TPM may be implemented in accordance with specifications such as the Trusted Computing Group (TCG) TPM Main Part 1 Design Principles Version 1.2, level 2 revision 103, dated Jul. 9, 2007 (hereinafter the "TPM specification"), which is available from the Internet at www.trustedcomputinggroup.org\home. In accordance with the TCG specification, a TPM stores an endorsement key and a storage root key internally, so that the endorsement and storage root keys are immutably bound to the platform protected by the TPM. Endorsement, storage root keys, and identity attestation keys are not migratable from one platform to another. (See TPM specification, sections 7, 7.1, 11.2, and 11.4.) As a result, the migration of data from one blade server to another is further complicated in an environment using TPM technology.

DETAILED DESCRIPTION

In general, a TCG-compliant TPM stores keys, passwords, and digital certificates securely. A TPM uses several types of keys, including identity keys to certify data; signing keys to sign data; storage keys to protect sensitive data including key material; and binding keys used to bind and protect sensitive data. A TPM attests to the identity and/or integrity of the platform, based on characteristics such as hardware components of the platform, including the processor(s) and chipset, as well as the software residing in the platform, such as the firmware and operating system. A TPM may also support auditing and logging of software processes, as well as verification of platform boot integrity, file integrity, and software licensing. A TPM is often described as providing a root of trust for a platform. However, as mentioned above, the endorsement key, storage root key, and identity attestation keys for a TPM are stored within the TPM, are immutably bound to the platform protected by the TPM, and thus are not migratable from one blade server to another.

Figure 1:
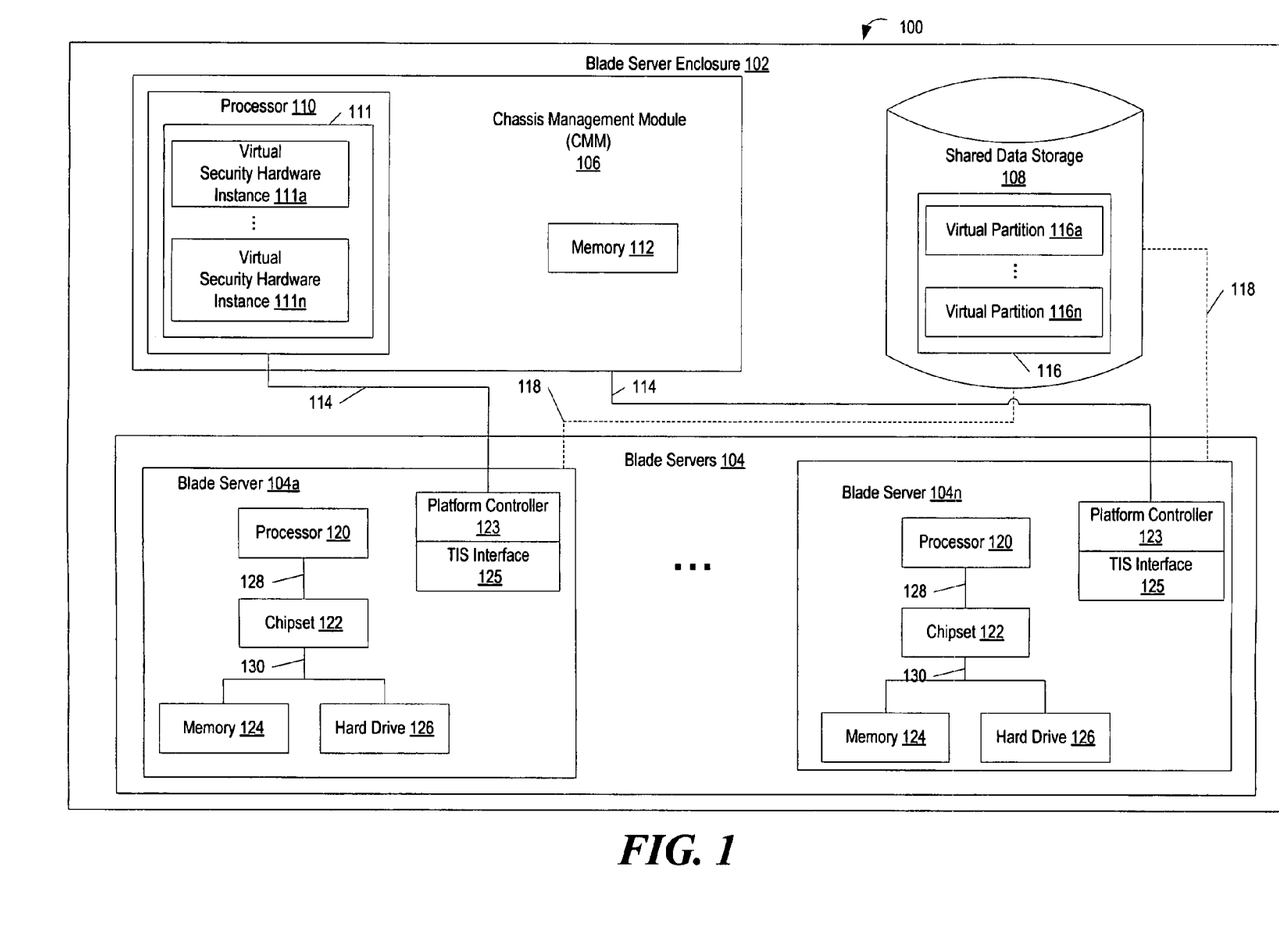
FIG. 1 is a block diagram illustrating at least one embodiment of a system to migrate data on a full disk encrypted disk volume from one blade server to another.

Referring now to FIG. 1, a blade server system 100 includes a blade server enclosure 102 and a plurality of blade servers 104 (shown as individual blade servers 104a-104n) housed in the blade server enclosure 102. The blade server enclosure 102 may be configured to support various numbers of blade servers 104. For example, the blade server enclosure 102 may be configured to house twenty, forty, one hundred, or more blade servers 104. To do so, the blade server enclosure 102 may include structural components such as guide rails or the like (not shown) to provide a slot or port for securing each of the blade servers 104 to the enclosure 102.

The blade server system 100 also includes a chassis management module (CMM) 106 and a shared data storage device 108 such as a hard drive. In the illustrative embodiment of FIG. 1, the chassis management module 106 and the storage device 108 are housed in the blade server enclosure 102. However, in other embodiments, the chassis management module 106 and the storage device 108 may be external or otherwise remote relative to the blade server enclosure 102. For example, the storage device 108 may be embodied as a remote hard drive, and/or the chassis management module 106 may be an external computer system connected via a secure network connection (not shown) to blade server system 100.

In the illustrative embodiment, the chassis management module 106 includes a processor 110 and a memory device 112. The processor 110 illustratively includes a single processor core (not shown). However, in other embodiments, the processor 110 may be embodied as a multi-core processor having any number of processor cores. Additionally, chassis management module 106 may include additional processors having one or more processor cores in other embodiments. The memory device 112 may be embodied as dynamic random access memory devices (DRAM), synchronous dynamic random access memory devices (SDRAM), double-data rate dynamic random access memory device (DDR SDRAM), and/or other volatile memory devices. Additionally, although only a single memory device is illustrated in FIG. 1, in other embodiments, the chassis management module 106 may include additional memory devices.

Processor 110 is shown as including a plurality of virtual security hardware instances 111 (with individual virtual security hardware instances 111a-111n). Each of virtual security hardware instances 111a-111n emulates the security features offered by a physical TPM to store keys, passwords, and digital certificates securely, but is not bound to the platform as a physical TPM would be bound to the platform. Virtual security hardware instances 111 can be emulated using a combination of hardware and software or in software only. Each virtual security hardware instance 111a-111n may be associated with a particular one of blade servers 104 (individually shown as blade servers 104a-104n) within blade enclosure 102. Because the keys associated with virtual security hardware instances 111 are not bound to particular hardware devices, the keys associated with virtual security hardware instances 111 are migratable from one blade server to another within blade servers 104.

Chassis management module 106 may include other components, sub-components, and devices not illustrated in FIG. 1 for clarity of the description. For example, it should be appreciated that the chassis management module 106 may include a chipset, input/output ports and interfaces, network controllers, and/or other components.

The chassis management module 106 is communicatively coupled to the blade servers 104 via a plurality of signal paths 114. The signal paths 114 may be embodied as any type of signal paths capable of facilitating communication between the chassis management module 106 and the individual blade servers 104. For example, the signal paths 114 may be embodied as any number of interfaces, buses, wires, printed circuit board traces, via, bus, intervening devices, and/or the like. Signal paths 114 are also referred to as an out-of-band communication channel 114 with reference to blade servers 104. The "out-of-band" description is used because signal paths 114 are not accessible via an external network, such as by connecting to one of blade servers 104 via a network interface controller within the blade server. If the chassis management module 106 is not housed inside blade server enclosure 102, signal paths 114 may be embodied as one or more secure network communication links that do not allow external network connections to individual blade servers 104a-104n.

As discussed above, the shared data storage may be embodied as any type of storage device capable of storing data from each of the blade servers 104. For example, in the embodiment illustrated in FIG. 1, the shared data storage device 108 is embodied as a hard drive having a plurality of virtual partitions 116 (with individual virtual partitions shown as 116a-116n). Each of the blade servers 104 is associated with one of the virtual partitions 116 and configured to store data within the associated virtual partition 116 during operation as discussed in more detail below. Because each of the blade servers 104 also has a respective virtual security hardware instance 111a-111n, data associated with the virtual security hardware instances 116a-116n may also be stored in the respective virtual partitions 116a-116n. The shared data storage 108 is communicatively coupled to each of the blade servers 104 via a plurality of signal paths 118. Similar to signal paths 114, the signal paths 118 may be embodied as any type of signal paths capable of facilitating communication between the shared data storage 108 and the individual blade servers 104. For example, the signal paths 118 may be embodied as any number of interfaces, buses, wires, printed circuit board traces, via, bus, intervening devices, and/or the like. If shared data storage 108 is external to blade server enclosure 102, then signal paths 118 may include one or more secure network communication links.

Each of the blade servers 104 includes a processor 120, a chipset 122, and a memory device 124. The processor 120 illustratively includes a single processor core (not shown). However, in other embodiments, the processor 120 may be embodied as a multi-core processor having any number of processor cores. Additionally, each of blade servers 104 may include additional processors having one or more processor cores in other embodiments. The processor 120 is communicatively coupled to the chipset 122 via a plurality of signal paths 128. The signal paths 128 may be embodied as any type of signal paths capable of facilitating communication between the processor 120 and the chipset 122 such as any number of interfaces, buses, wires, printed circuit board traces, via, bus, intervening devices, and/or the like.

The memory device 124 may be embodied as dynamic random access memory devices (DRAM), synchronous dynamic random access memory devices (SDRAM), double-data rate dynamic random access memory device (DDR SDRAM), and/or other volatile memory devices. Additionally, although only a single memory device is illustrated in FIG. 1, in other embodiments, each blade server 104 may include additional memory devices. The memory 124 is communicatively coupled to the chipset 122 via a plurality of signal paths 130. Similar to the signal paths 128, the signal paths 130 may be embodied as any type of signal paths capable of facilitating communication between the chipset 122 and the memory 124 such as any number of interfaces, buses, wires, printed circuit board traces, via, bus, intervening devices, and/or the like.

Each of blade servers 104 may also include other devices such as various peripheral devices. For example, as illustrated in FIG. 1, each of the blade servers 104 may include an individual hard drive 126 or other peripheral device. Hard drive 126 is representative of any type of data storage for blade servers 104, including locally attached SAS (serial attached storage), Internet SCSI-network attached or Infiniband attached storage. Data stored on hard drive 126 may be protected using full disk encryption. Additionally, it should be appreciated that each of blade servers 104 may include other components, sub-components, and devices not illustrated in FIG. 1 for clarity of the description. For example, it should be appreciated that the chipset 122 of each of blade servers 104 may include a memory controller hub (MCH) or northbridge, an input/output controller hub (ICH) or southbridge, a baseboard management controller (BMC) for out-of-band management of platform hardware, and/or other devices.

Each of blade servers 104 also includes a platform controller 123. Platform controller 123 provides logic to manage an out-of-band interface between chassis management module 106 and platform hardware. For example, platform controller 123 may be provided by a Baseboard Management Controller (BMC) in accordance with the Intelligent Platform Management Interface (IPMI) architecture. An out-of-band interface such as IPMI operates independently of an operating system ((OS), not shown in FIG. 1) running on processor 120 and allows an administrator using chassis management module 106 or other system management software to manage the entire blade server enclosure 102 even in the absence of an operational operating system on one or more of the individual blade servers 104a-104n. Platform controller 123 is communicatively coupled to chassis management module 106 by signal paths 114, which may serve as an out-of-band communication channel with respect to blade servers 104. Out-of-band communication channel 114 enables chassis management module 106 to communicate directly with platform hardware.

In one embodiment, platform controller 123 provides a TPM Interface Specification (TIS) interface 125 in conformance with the TCG's TPM Interface Specification such that software running on a blade server such as blade server 104a functions as if blade server 104a were protected by security hardware such as a TPM. TIS interface 125 may provide, for example, memory-mapped I/O registers in conformance with the TCG's TPM Interface Specification. Rather than provide the TPM functionality in a hardware component on each of blade servers 104, however, in one embodiment TPM commands issued by host software on a given blade server such as blade server 104a are sent by platform controller 123 via out-of-band communication channel 114 to chassis management module 106.

In one embodiment, platform controller 123 and TIS interface 125 functionality are provided by Intel's Management Engine integrated TPM (iTPM) as provided in the Intel ICH10 platform controller hub.

Chassis management module 106 acts on the TPM (or other security hardware) commands issued by host software on the blade servers 104, providing security functionality such as encryption and decryption keys to the blade servers 104. For example, each of blade servers 104 may include host software such as Microsoft Windows Server 2008 operating system with the BitLocker feature to provide security in the form of full disk encryption to data stored on blade servers 104. TPM (or other security hardware) commands issued by the Server 2008 operating system instance running on a particular blade server such as blade server 104a are processed by chassis management module 106. The operation of chassis management module 106 is described in further detail with reference to FIG. 2.

Referring again to FIG. 1, each of the blade servers 104 is configured to store environment data on the shared data storage device 108 in one of the associated virtual partitions 116 (individually shown as virtual partitions 116a-116n). The data stored on shared storage device 108 includes data necessary to reconstruct the computing environment, such as processor state information and register contents for the computing environment. If a migration event occurs, such as a failure of one of the blade servers such as blade server 104a, the chassis management module 106 migrates the computing environment, such as a virtual machine, of the failing blade server 104a to a new blade server, such as blade server 104n. Because each of the blade servers 104 uses a shared storage space (e.g., a shared hard drive), the computing environment of the failing blade server 104a may be migrated without the need to transfer the large amount of data stored on the shared data storage device 108. Rather, the logical unit number (LUN) associated with the virtual partition used by the failing blade server 104a, such as the logical unit for virtual partition 116a, may be transferred to the new, replacement blade server 104n. Additionally, the state of the processor 120 of the failing blade server 104a may be transferred to the replacement blade server 104n.

Figure 2:
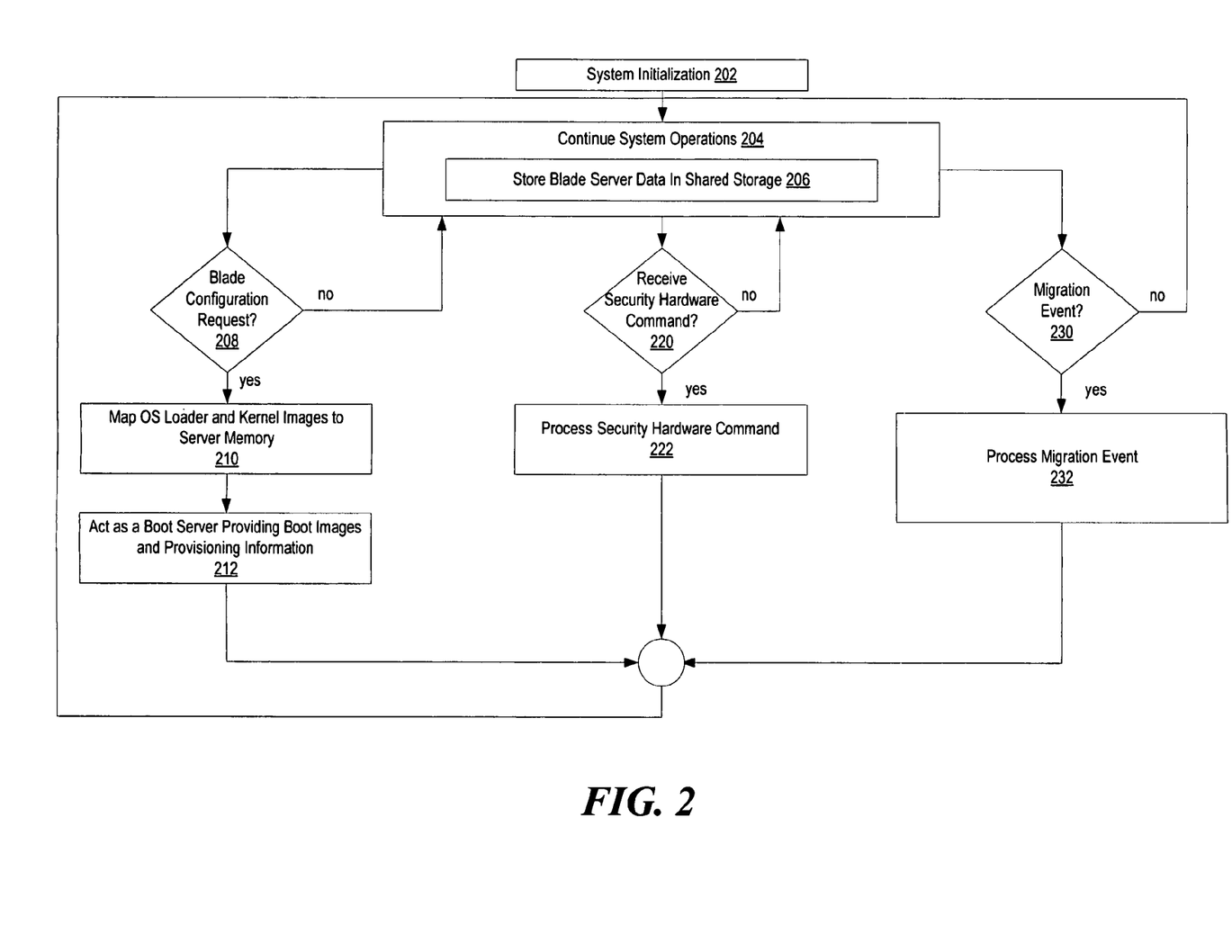
FIG. 2 is a flowchart describing the operation of the chassis management module of FIG. 1 in managing blade servers and providing functionality for migrating full-disk encrypted virtualized storage from one blade server to another.

FIG. 2 describes the operation of chassis management module 106 of FIG. 1 in managing blade servers and providing functionality for migrating full-disk encrypted virtualized storage from one blade server to another. In "System Initialization" step 202, system initialization is performed. For example, the chassis management module 106 and each of the blade servers 104 are initialized in block 202. The steps involved in initial configuration of an individual blade server are described in further detail with reference to FIG. 2 steps 208 through 212.

After "System Initialization" step 220, chassis management module 106 transitions to "Continue System Operations" step 204. In "Continue System Operations" step 204, the blade server system 100 continues normal operation. That is, each of the blade servers 104 continues normal operation, which may, for example, include processing data, storing data, and establishing one or more virtual machines. During operation, each of the blade servers 104 is configured to store environment data, such as data related to the state of operation of the respective blade server, in the shared data storage device 108 (e.g., a hard drive) as indicated in block 206. This environment data stored on shared data storage device 108 is in addition to application-level data stored by a blade server such as blade server 104a on its respective hard drive 126. The application-level data stored on the respective hard drives 126 may be protected by full disk encryption.

One or more of the virtual partitions 116 may be assigned to one of the blade servers 104 and/or one or more virtual machines established on one of the blade servers 104. The location of the respective virtual partition 116a-116n on the shared data storage device 108 is identified by a logical unit number (LUN). As such, each of blade servers 104 and/or each virtual machine established on each of blade servers 104 may be configured to store data related to that blade server's computing environment in an associated one of the virtual partitions 116 of the data storage device 108 based on an assigned logical unit number.

Referring again to FIG. 2, at "Blade Configuration Request?" decision point 208, the chassis management module 106 of the blade server system 100 monitors for a blade configuration request. A blade configuration request may be generated when a new blade server 104 is coupled to the blade server system 100 or is otherwise rebooted or initialized (as described above with reference to "System Initialization" step 202). If a blade configuration request is received, chassis management module 106 transitions to "Map OS Loader and Kernel Images to Server Memory" step 210, where an operating system loader and kernel images are mapped to the memory 124 of one of the blade servers 104. Chassis management module 106 causes the BIOS for a given blade server such as blade server 104a to invoke the operating system loader, which in turn loads an operating system instance such as a Microsoft Windows Server 2008 operating system instance. When the operating system and kernel images have been loaded to the blade server memory 124, chassis management module 106 transitions to "Act as a Boot Server Providing Boot Images and Provisioning Information" step 412, where chassis management module 106 acts as a boot server to the new blade server such as blade server 104a and provides boot images and provisioning information to the requesting blade server 104a. Upon completion of "Act as a Boot Server Providing Boot Images and Provisioning Information" step 412, chassis management module 106 returns to "Continue System Operations" step 204 of FIG. 2.

In addition to monitoring for blade configuration requests, chassis management module 106 monitors for security hardware commands at "Receive Security Hardware Command" decision point 220. An example of one type of security hardware command is a "take ownership" command where a given blade server's operating system requests to take ownership of associated security hardware. These security hardware commands may be received, for example, via out-of-band communication channel 114 from platform controller 123 as described above with reference to FIG. 1. The actions of platform controller 123 in processing these security hardware commands are described in further detail with reference to FIG. 5.

Referring again to FIG. 2, when a security hardware command is received, chassis management module 106 transitions to "Process Security Hardware Command" step 222.

"Process Security Hardware Command" step 222 is discussed in further detail with reference to FIG. 3.

Referring again to FIG. 2, in addition to monitoring for blade configuration requests and security hardware commands, chassis management module 106 monitors for a migration event at "Migration Event" decision point 230. The migration event may be embodied as any one of a number of events that prompt the migration of a computing environment such as a virtual machine from one blade server such as blade server 104a to another blade server such as blade server 104n. For example, in some embodiments, the migration event may be defined by failure of blade server 104a or devices or components of the blade server 104a. Additionally or alternatively, the migration event may be based on load balancing or optimization considerations. For example, the chassis management module 106 may be configured to monitor the load of each of the blade servers 104. Chassis management module 106 may migrate virtual machines or other computing environments from those blade servers 104 having excessive loads to other blade servers 104 having loads of lesser value such that the total load is balanced or otherwise optimized across the plurality of blade servers 104.

Additionally or alternatively, a migration event may be based on a predicted failure. For example, chassis management module 106 may be configured to monitor the power consumption, temperature, or other attribute of each of blade servers 104. The chassis management module 106 may further be configured to determine the occurrence of a migration event when the power consumption, temperature, or other attribute of one of blade servers 104 is above some predetermined threshold, which may be indicative of a future failure of that particular blade server. Such power consumption, temperature, and other attributes may be monitored over a period of time and averaged to avoid false positives of migration events due to transient events such as temperature spikes.

Upon detection of a migration event at "Migration Event" decision point 230, chassis management module 106 transitions to "Process Migration Event" step 232. "Process Migration Event" step 232 is discussed in further detail with reference to FIG. 4.

It should be appreciated that the chassis management module 106 may monitor for blade configuration requests, security hardware commands, and migration events in a contemporaneous, near contemporaneous, or sequential manner. That is, in FIG. 2, decision points 208, 220, and 230 may be executed by the chassis management module 106 or other component of the blade server system 100 contemporaneously with each other or sequentially in a predefined order.

Figure 3:
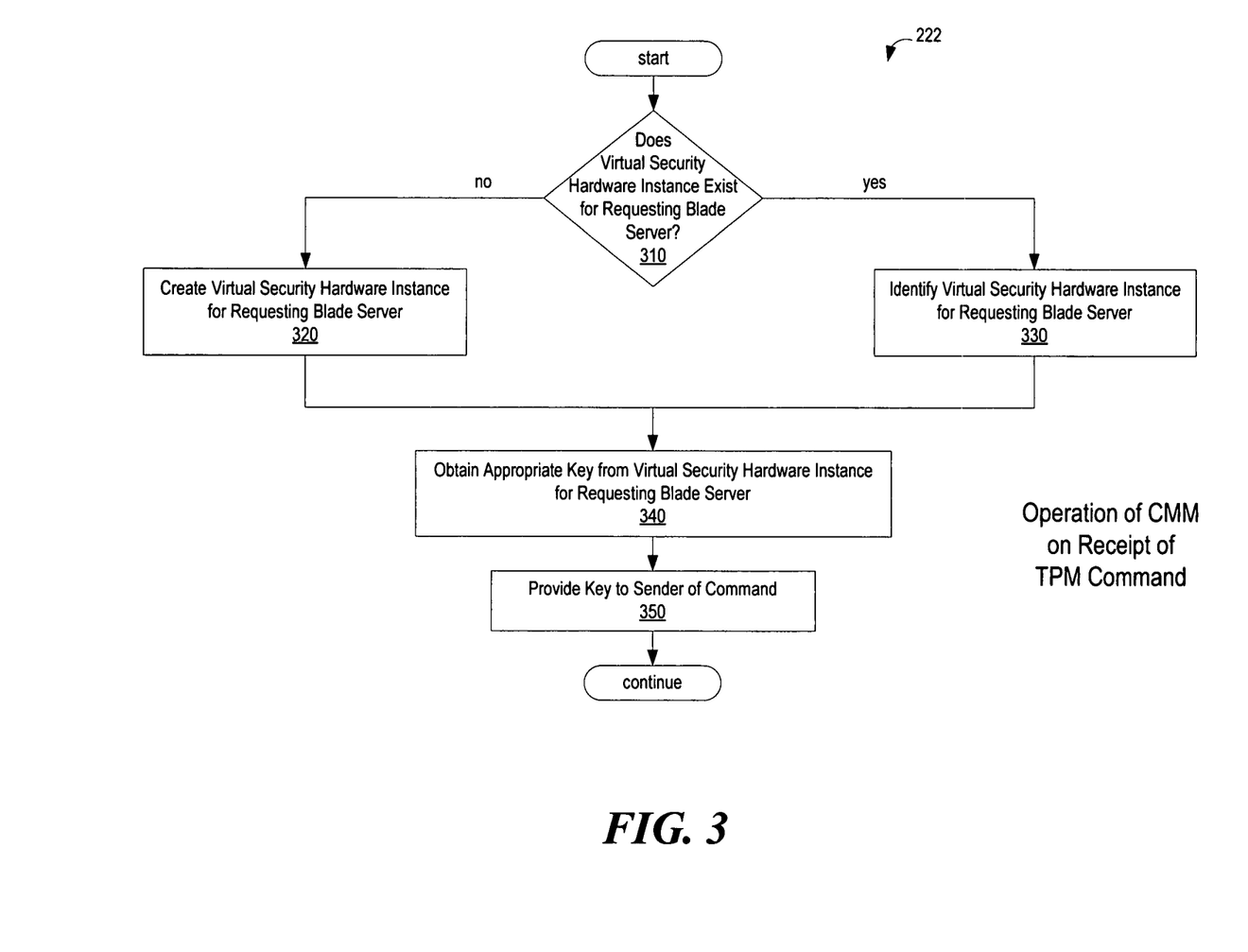
FIG. 3 is a flowchart describing the operation of the chassis management module of FIG. 1 in processing a security hardware command.

Referring to FIG. 3, an algorithm for processing security hardware commands by chassis management module 106 is provided. Chassis management module 106 acts on hardware security commands, such as TPM commands, issued by host software on the blade servers 104, providing security functionality including encryption and decryption keys to the blade servers 104.

For example, if chassis management module 106 determines that a blade server's operating system has requested to take ownership of security hardware for the blade server, chassis management module 106 creates a virtual security hardware instance, such as one of virtual security hardware instances 111a-111n, to emulate the security hardware for the requesting blade server. The operating system for the blade server functions as if physical security hardware were available for the blade server, but the security hardware is instead emulated by chassis management module 106. This emulation enables the blade server operating system to operate without modification as if security hardware were present, while still providing the blade server with equivalent security protection. In response to the take ownership command, chassis management module 106 emulates the security hardware by creating a virtual security hardware instance, such as one of virtual security hardware instances 111a-111n, for the requesting blade server.

In processing a security hardware command, chassis management module 106 begins at "Does Virtual Security Hardware Instance Exist for Requesting Blade Server?" decision point 310. If no virtual security hardware instance exists for the requesting blade server, control transitions to "Create Virtual Security Hardware Instance for Requesting Blade Server" step 320. Alternatively, if a virtual security hardware instance has already been created for the requesting blade server, control transitions to "Identify Virtual Security Hardware Instance for Requesting Blade Server" step 330.

At "Create Virtual Security Hardware Instance for Requesting Blade Server" step 320, chassis management module 106 creates a virtual security hardware instance, such as one of virtual security hardware instances 111a-111n, to provide security protection that otherwise would be provided by physical security hardware on the blade server. This security protection may be implemented by the virtual security hardware instance using one or more security hardware components such as TPMs under the control of the chassis management module 106. Alternatively, the virtual security hardware instance may provide security protection as a logical device. An example implementation of providing a virtual security hardware instance as a logical device is described in pending patent application Ser. No. 10/876,994, entitled "Method and Apparatus for Providing Secure Virtualization of a Trusted Platform Module," which is assigned to the assignee of the present application and is incorporated by reference in its entirety herein.

Providing security protection of blade servers 104 by chassis management module 106 is more secure than having a physical security hardware device on each of the blade servers because the physical and/or logical devices managed by chassis management module 106 are separated from the blade servers 104 by an out-of-band communication channel such as out-of-band communication channel 114. Tampering with the security protection of blade servers 104 would require compromising not only one of the blade servers 104 but also the communication occurring via out-of-band communication channel 114 with the chassis management module 106.

At "Identify Virtual Security Hardware Instance for Requesting Blade Server" step 330, the virtual security hardware instance for the requesting blade server is identified by chassis management module 106. Chassis management module 106 may look up the associated virtual security hardware instance in a table stored in memory 112. The virtual security hardware instance may be identified, for example, using a key provided with the security hardware command.

When the virtual security hardware instance for the requesting blade server is created or identified at respective "Create Virtual Security Hardware Instance for Requesting Blade Server" step 320 or "Identify Virtual Security Hardware Instance for Requesting Blade Server" step 330, chassis management module 106 transitions to "Obtain Appropriate Key from Virtual Security Hardware Instance for Requesting Blade Server" step 340. Depending upon the security hardware command, a different type of key may be obtained. For example, chassis management module 106 may provide a storage root key for the associated virtual security hardware instance in response to a "take ownership" command, an encryption key in response to a request to create an encryption key, and so on. The virtual security hardware instance provides a key as if a physical TPM were present to provide the key for the requesting blade server.

From "Obtain Appropriate Key from Virtual Security Hardware Instance for Requesting Blade Server" step 340, chassis management module 106 transitions to "Provide Key to Sender of Command" step 350. Chassis management module 106 provides the key via out-of-band communication channel 114 to platform controller 123 for the requesting blade server. The operation of platform controller 123 is described in further detail with reference to FIG. 5.

Figure 4:
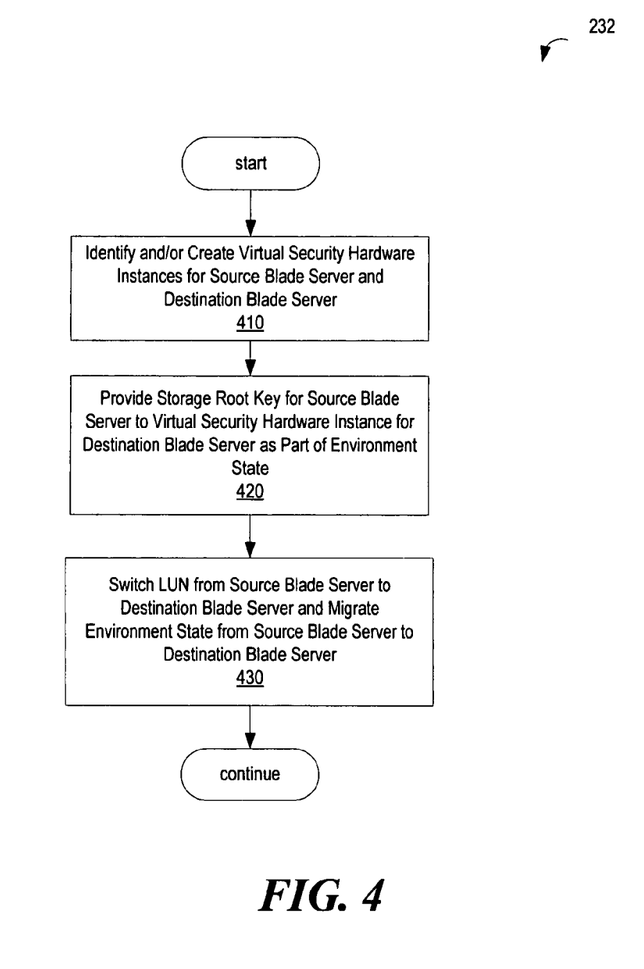
FIG. 4 is a flowchart describing the operation of the chassis management module of FIG. 1 in processing a migration event among blade servers protected by security hardware and full disk encryption.

Referring to FIG. 4, the operation of chassis management module 106 is described in processing a migration event among blade servers protected by security hardware and full disk encryption. During a migration event, the computing environment (e.g., one or more virtual machines) is migrated from one blade server, described herein as the source blade server, to another blade server, described herein as the destination blade server. For example, if the chassis management module 106 determines that a blade server such as blade server 104a has failed, will likely fail, or is over loaded, chassis management module 106 may migrate the computing environment such as one or more virtual machines from the source blade server 104a to a destination blade server such as blade server 104n. The destination blade server may be a new blade server or a pre-existing blade server operating at less than full capacity.

To migrate data from one blade server to another in an environment protected by security hardware and full disk encryption, chassis management module 106 begins at "Identify and/or Create Virtual Security Hardware Instances for Source Blade Server and Destination Blade Server" step 410. If a new blade server has been added to provide the destination blade server, a corresponding virtual security hardware instance may need to be created as previously described with reference to "Create Virtual Security Hardware Instance for Requesting Blade Server" step 320 of FIG. 3. Otherwise, chassis management module 106 identifies the virtual security hardware instances for the source and destination blade servers. Chassis management module 106 then transitions to "Provide Storage Root Key for Source Blade Server to Virtual Security Hardware Instance for Destination Blade Server as Part of Environment State" step 420. In one embodiment, the entire state of the virtual security hardware instance (such as the entire state of all memory variables associated with one of virtual security hardware instances 111a-111n including the storage root key), is copied from the source virtual security hardware instance to the destination security hardware instance. This state information is copied from one virtual security hardware instance to another, such as from virtual security hardware instance 111a associated with blade server 104a to virtual security hardware instance 111n associated with blade server 104n within chassis management module 106. In addition, the state information may be copied from one virtual partition to another for the associated blade servers, such as from virtual partition 116a associated with blade server 104a to virtual partition 116n associated with blade server 104n.

To migrate the computing environment of one blade server 104a to another blade server 104n, chassis management module 106 then transitions to "Switch LUN to Destination Blade Server and Migrate Environment State from Source Blade Server to Destination Blade Server" step 430. In this step, chassis management module 106 switches or otherwise transfers the logical unit number (LUN) used by the source blade server 104a, which identifies one of the virtual partitions 116 such as virtual partition 116a associated with source blade server 104a, to the destination blade server 104n. This transfer of the LUN from one blade server to another occurs by copying data from one virtual partition to another. As a result, the destination blade server 104n will have access to all of the environment data used by and stored by the first blade server 104a in the associated virtual partition 116a. In addition, chassis management module 106 may transfer the state of the central processing unit or processor 120 of the source blade server 104a to the destination blade server 104n. For example, the chassis management module 106 may copy the data contained in the software registers of the source blade server 104a to the software registers of the destination blade server 104n. In addition, the LUN may be copied from virtual security hardware instance 116a associated with blade server 104a to the virtual security hardware instance 116n associated with blade server 104n.

Additional data or state information, such as a storage root key for the virtual security hardware instance for source blade server 104a may be transferred from the source blade server 104a to the destination blade server 104n. The entire state of the virtual security hardware instance for source blade server 104a may be transferred to a respective virtual partition, such as virtual partition 116n, to accomplish the migration. By transferring a storage root key from one virtual security hardware instance to another, the destination blade server obtains access to all of the data encrypted by hardware at the first blade server without the need to decrypt the data prior to migration. This technique effectively extends the concept of the TCG "Trusted Building Block" associated with a TPM from a single blade server to a chassis management module in combination with a blade server. The concept of the platform associated with a TPM is similarly extended to a chassis management module in combination with a blade server. By extending the concept of the platform to a chassis management module in combination with a blade server, a storage root key for the platform can be migrated from one blade server to another.

It should be appreciated that because the environment data used by a given blade server such as blade server 104a is not transmitted (e.g., transmitted by means of an Ethernet connection from one blade server to another), the security of the environment data used by source blade server 104a is increased. That is, the data used by the source blade server 104a to manage the computing environment is effectively transferred to the destination blade server 104n via the transfer of the logic unit number rather than the transfer of the actual environment data. As such, the "transferred" environment data remains stored on the shared data storage device 108.

Figure 5:
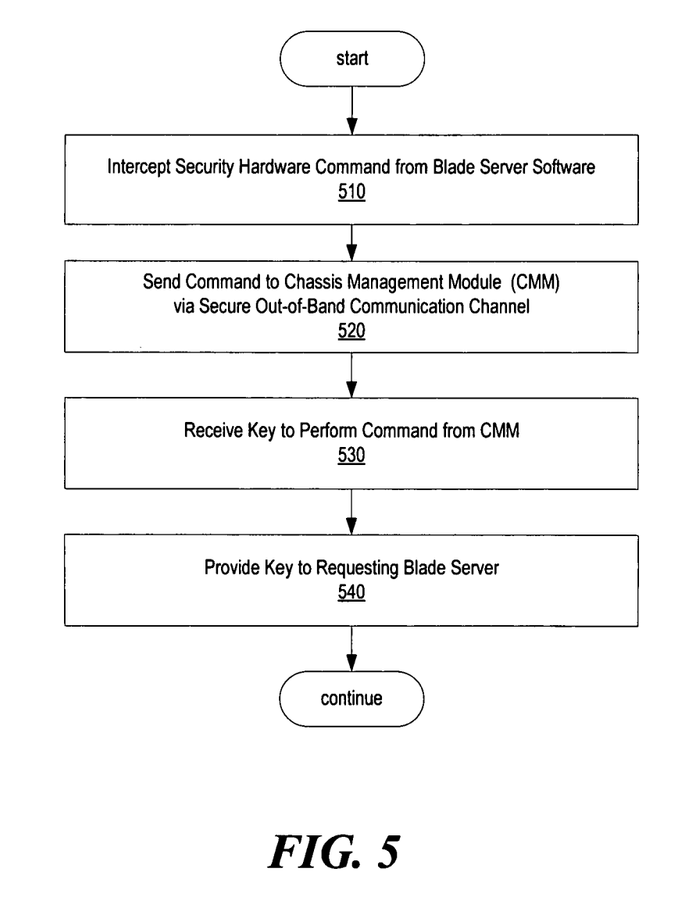
FIG. 5 is a flowchart describing the operation of the platform controller of FIG. 1 in processing a security hardware command.

Referring to FIG. 5, a flowchart shows the operation of an embodiment of the platform controller 123 of FIG. 1 in processing a security hardware command. As described with reference to FIG. 1, platform controller 123 may provide a TIS interface 125 in conformance with the TCG's TPM Interface Specification such that software running on a blade server such as blade server 104a functions as if blade server 104a were protected by security hardware such as a TPM. TIS interface 125 may provide, for example, memory-mapped I/O registers in conformance with the TCG's TPM Interface Specification. Rather than provide the TPM functionality in a hardware component on each of blade servers 104, however, in one embodiment TPM commands issued by host software on a given blade server such as blade server 104a are sent by platform controller 123 via out-of-band communication channel 114 to chassis management module 106.

Referring to FIG. 5, at "Intercept Security Hardware Command from Blade Server Software" step 510, platform controller 123 intercepts the security hardware command sent by software running on a blade server such as blade server 104a via TIS interface 125. Platform controller 123 transitions to "Send Command to Chassis Management Module (CMM) via Secure Out-of-Band Communication Channel" step 520, where platform controller 123 sends the security hardware command to chassis management module 106 via a secure out-of-band communication channel such as out-of-band communication channel 114 of FIG. 1. Control then transitions to "Receive Key to Perform Command from CMM" step 530, where platform controller 123 receives the key via secure out-of-band communication channel 114 from chassis management module 106. Platform controller 123 then transitions to "Provide Key to Requesting Blade Server" step 540, where platform controller 123 provides the key via TIS interface 125 to the blade server software that issued the command intercepted at "Intercept Security Hardware Command from Blade Server Software" step 510. The blade server software then uses the key to perform the command. For example, blade server software such as Microsoft Server 2008 may use the BitLocker feature to use a storage root key provided by chassis management module 106 to encrypt or decrypt data stored on blade server 104a.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code, such as code to implement the algorithms shown in the flowcharts of FIGS. 2-5, may be applied to input data to perform the functions described herein and generate output information. For example, this program code may include firmware for a microcontroller encoded to perform embodiments of the methods shown in FIGS. 2-5. Accordingly, embodiments of the invention also include machine-accessible media containing instructions for performing the operations of the invention or containing design data, such as HDL, which defines structures, circuits, apparatuses, processors and/or system features described herein. Such embodiments may also be referred to as program products.

Such machine-accessible storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Presented herein are embodiments of methods and systems for enabling migration of full disk encrypted data between blade servers. While particular embodiments of the present invention have been shown and described, it will be obvious to those skilled in the art that numerous changes, variations and modifications can be made without departing from the scope of the appended claims. Accordingly, one of skill in the art will recognize that changes and modifications can be made without departing from the present invention in its broader aspects. The appended claims are to encompass within their scope all such changes, variations, and modifications that fall within the true scope and spirit of the present invention.

What is claimed is:

1. A method comprising:

with a chassis management module instantiating a plurality of virtual security hardware instances corresponding to a plurality of blade servers, obtaining a key from a first virtual security hardware instance of said plurality of virtual security hardware instances, the key to perform an operation on a first blade server of said plurality of blade servers, wherein the first virtual security hardware instance corresponds to said first blade server;

in response to a command directed at first security hardware of the first blade server, providing the key to the first blade server via a secure out-of-band communication channel between said chassis management module and said plurality of blade servers, wherein the secure out-of-band communication channel comprises a signal path that is inaccessible to an external network;

with said chassis management module, migrating, without decrypting, encrypted data stored on the first blade server to a second blade server of said plurality of blade servers, the encrypted data having been encrypted with the key; and with said chassis management module, migrating said key from said first virtual security hardware instance to a second virtual security hardware instance of said plurality of virtual security hardware instances via said secure out-of-band communication channel, the second virtual security hardware instance corresponding to said second blade server.

2. The method of claim 1 further comprising:
using the key to access the encrypted data with the second blade server.

3. The method of claim 1, further comprising:
intercepting the command directed to the first security hardware associated with the first blade server; and
sending the command via the secure out-of-band communication channel to the first virtual security hardware instance.

4. The method of claim 1 wherein the key is a storage root key for the first virtual security hardware instance.

5. The method of claim 1, wherein each of said plurality of virtual security hardware instances is configured to emulate security features of a physical trusted platform module.

6. A system comprising:
a plurality of blade servers, a chassis management module, and a secure out-of-band communication channel between the plurality of blade servers and the chassis management module, the secure out-of-band communication channel being inaccessible to an external network, wherein:
the chassis management module is configured to:
instantiate a plurality of virtual security hardware instances respectively corresponding to said plurality of blade servers;
obtain a key from a first virtual security hardware instance of said plurality of virtual security hardware instances, the key to perform an operation on a first blade server of said plurality of blade servers, wherein the first virtual hardware instance corresponds to said first blade server; and
in response to a command directed at first security hardware of the first blade server, provide the key to the first blade server via the security out-of-band communication channel:
the first blade server comprises an interface configured to obtain the key to perform the operation on the first blade server; and
the chassis management module is further configured to:
migrate, without decrypting, encrypted data stored on the first blade server to a second blade server of said plurality of blade servers, the encrypted data having been encrypted with the key; and
migrate the key from the first virtual security hardware instance to a second virtual security hardware instance of said plurality of virtual security hardware instances via said secure out-of-band communication channel, the second virtual security hardware instance corresponding to said second blade server.

7. The system of claim 6 wherein
the first blade server is configured to use the key to perform hardware encryption of data stored on the first blade server to produce said encrypted data; and
the second blade server is configured to use the key to access the encrypted data.

8. The system of claim 6, further comprising:
an interface at the first blade server configured to
intercept the command directed to the first security hardware associated with the first blade server; and
send the command via the secure out-of-band communication channel to the first virtual security hardware instance.

9. The system of claim 6 wherein
the key is a storage root key for the first virtual security hardware instance.

10. The system of claim 6, wherein each of said plurality of virtual security hardware instances is configured to emulate security features of a physical trusted platform module.

11. A non-transitory computer-readable storage medium comprising instructions which when executed by at least one processor cause the performance of the following operations comprising:
instantiating a plurality of virtual security hardware instances corresponding to a plurality of blade servers with a chassis management module;
obtaining a key from a first virtual security hardware instance of said plurality of virtual security hardware instances, the key to perform an operation on a first blade server of said plurality of blade servers, wherein the first virtual security hardware instance corresponds to said first blade server;
in response to a command directed at first security hardware of the first blade server, providing the key to the first blade server via a secure out-of-band communication channel between said chassis management module and said plurality of blade servers, wherein the secure out-of-band communication channel comprises a signal path that is inaccessible to an external network;
migrating, without decrypting, encrypted data stored on the first blade server to a second blade server of said plurality of blade servers, the encrypted data having been encrypted with the key; and
migrating said key from said first virtual security hardware instance to a second virtual security hardware instance of said plurality of virtual security hardware instances via said secure out-of-band communication channel, the second virtual security hardware instance corresponding to said second blade server.

12. The computer-readable storage medium of claim 11, wherein said instructions when executed further cause the performance of the following operations comprising:
using the key to perform hardware encryption of data stored on the first blade server; and
using the key to access the data at the second blade server.

13. The computer-readable storage medium of claim 11, wherein said instructions when executed further cause the performance of the following operations comprising:
intercepting the command directed to the first security hardware associated with the first blade server; and
sending the command via the secure out-of-band communication channel to the first virtual security hardware instance.

14. The computer-readable storage medium of claim 11 wherein the key is a storage root key for the first virtual security hardware instance.

15. The computer readable storage medium of claim 11, wherein each of said plurality of virtual security hardware instances is configured to emulate security features of a physical trusted platform module.

* * * * *